United States Patent [19]

East et al.

[11] 4,318,842

[45] Mar. 9, 1982

[54] POLYESTER OF 6-HYDROXY-2-NAPHTHOIC ACID, AROMATIC DIOL, AND 1,4-CYCLOHEXANEDICARBOXYLIC ACID CAPABLE OF UNDERGOING MELT PROCESSING

[75] Inventors: Anthony J. East, Madison; Gordon W. Calundann, North Plainfield, both of N.J.

[73] Assignee: Celanese Corporation, New York, N.Y.

[21] Appl. No.: 194,199

[22] Filed: Oct. 6, 1980

[51] Int. Cl.³ .............................................. C08G 63/60
[52] U.S. Cl. .................... 524/605; 528/173; 528/190
[58] Field of Search ............ 260/40 R, 40 P; 528/173, 190

[56] References Cited

U.S. PATENT DOCUMENTS

| | | | |
|---|---|---|---|
| 4,118,372 | 10/1978 | Schaefgen | 528/191 |
| 4,161,470 | 7/1979 | Calundann | 260/40 R |
| 4,184,996 | 1/1980 | Calundann | 260/40 R |
| 4,219,461 | 8/1980 | Calundann | 260/40 R |
| 4,238,599 | 12/1980 | Langley et al. | 528/193 |
| 4,256,624 | 3/1981 | Calundann | 260/40 R |

*Primary Examiner*—Maurice J. Welsh
*Attorney, Agent, or Firm*—Charles B. Barris

[57] ABSTRACT

A novel polyester is provided which has been found to exhibit an optically anisotropic melt phase which enables it readily to undergo melt processing to form quality fibers, films, molded articles, etc. The polyester of the present invention contains recurring 6-oxy-2-naphthoyl moieties in addition to moieties derived from at least one aromatic diol and trans-1,4-cyclohexanedicarboxylic acid in the proportions indicated. The hydrogen atoms present upon the rings of these moieties optionally may be at least partially substituted (as described). The polyester is capable of forming the desired anisotropic melt at a temperature below approximately 350° C., and in a particularly preferred embodiment at a temperature below approximately 320° C.

37 Claims, No Drawings

POLYESTER OF 6-HYDROXY-2-NAPHTHOIC ACID, AROMATIC DIOL, AND 1,4-CYCLOHEXANEDICARBOXYLIC ACID CAPABLE OF UNDERGOING MELT PROCESSING

BACKGROUND OF THE INVENTION

It has been disclosed that certain polyesters may be formed which exhibit melt anisotropy. See, for instance, (a) *Polyester X7G-A Self Reinforced Thermoplastic*, by W. J. Jackson Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 838,935 and 828,936, (c) Dutch Pat. No. 7505551, (d) West German Pat. Nos. 2520819, 2520820, 2722120, 2834535, 2834536, and 2834537, (e) Japanese Pat. Nos. 43-223; 2132-116; 3017-692; and 3021-293, (f) U.S. Pat. Nos. 3,991,013; 3,991,014; 4,057,597; 4,066,620; 4,067,852; 4,075,262; 4,083,829; 4,118,372; 4,130,545; 4,130,702; 4,156,070; 4,159,365; 4,161,470; 4,169,933; and 4,181,792; and (g) U.K. Application No. 2,002,404. See also commonly assigned U.S. Ser. Nos. 10,392, filed Feb. 8, 1979 now U.S. Pat. No. 4,238,599, issued Dec. 9, 1980; 10,393, filed Feb. 8, 1979 (now U.S. Pat. No. 4,238,598); and 32,086, filed Apr. 23, 1979 now U.S. Pat. No. 4,219,461, issued Aug. 26, 1980.

Additionally, in commonly assigned U.S. Pat. No. 4,184,996 is disclosed a polyester which consists essentially of p-oxybenzoyl, 2,6-dioxynaphthalene, and terephthaloyl recurring units. In commonly assigned U.S. application Ser. No. 54,049, filed July 2, 1979 now U.S. Pat. No. 4,256,624, issued Mar. 17, 1981, is disclosed a polyester which consists essentially of 6-oxy-2-naphthoyl, dioxyaryl, and dicarboxyaryl recurring units. Schaefgen, U.S. Pat. No. 4,118,372, broadly discloses polyesters which exhibit an anisotropic melt phase and which consist essentially of recurring units derived from diacids, diols, and hydroxy acids. The inclusion of a 1,4-dicarboxycyclohexane moiety is disclosed, for example, at column 2, line 5 and in several of the Examples. Furthermore, $R_1$, $R_2$, and $R_3$ in the formulas of U.S. Pat. No. 4,118,372 may be, as defined in Columns 1 and 2, "radicals selected from the group of (1) single and fused 6-membered aromatic carbocyclic ring systems wherein the chain extending bonds of the ring system if attached to the same ring are positioned 1,4- to each other, and if attached to different rings, are in positions parallel and oppositely directed, . . . ." Two-ring systems are illustrated at Column 2. However, a polyester which incorporates a moiety derived from 6-hydroxy-2-naphthoic acid is not identified anywhere in the patent. Moreover, it has not previously been disclosed to provide a polyester resulting from the unique combination of recurring units derived from 6-hydroxy-2-naphthoic acid and trans-1,4-cyclohexanedicarboxylic acid, together with recurring units derived from an aromatic diol.

Therefore, it is an object of the present invention to provide an improved polyester which is suited for the formation of quality molded articles, melt extruded fibers, and melt extruded films.

It is also an object of the present invention to provide an improved melt processable polyester capable of forming an anisotropic melt phase at a temperature below approximately 350° C., and preferably below approximately 320° C.

It is also an object of the present invention to provide an improved polyester which forms a highly tractable melt phase.

It is also an object of the present invention to provide an improved polyester which forms an anisotropic melt phase at a temperature well below its decomposition temperature and which may form quality fibers, films, and molded articles.

It is also an object of the present invention to provide an improved polyester which is capable of forming molded articles exhibiting high impact strength.

These and other objects, as well as the scope, nature, and utilization of the present invention, will be apparent to those skilled in the art from the following detailed description.

SUMMARY OF THE INVENTION

A melt processable polyester capable of forming an anisotropic melt phase at a temperature below approximately 350° C. is provided. The polyester consists essentially of the recurring moieties I, II, III, and IV which may include substitution of at least some of the hydrogen atoms present upon an aromatic ring wherein I is

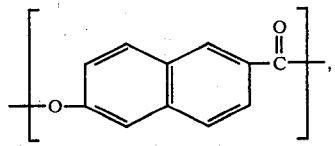

II is a dioxyaryl moiety of the formula $+\text{O}-\text{Ar}-\text{O}+$ where Ar is a divalent radical comprising at least one aromatic ring, III is

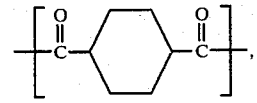

wherein at least approximately 90 percent of said III units are in the trans configuration, and IV is a dicarboxyaryl moiety of the formula

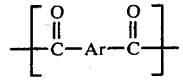

where Ar is a divalent radical comprising at least one aromatic ring, with said optional substitution if present being selected from the group consisting of an alkyl group of 1 to 4 carbon atoms, an alkoxy group of 1 to 4 carbon atoms, halogen, a phenyl group, and mixtures of the foregoing, and wherein said polyester comprises approximately 20 to 90 mole percent of moiety I, approximately 5 to 40 mole percent of moiety II, approximately 10 to 40 mole percent of moiety III, and approximately 0 to 30 mole percent of moiety IV.

DESCRIPTION OF THE PREFERRED EMBODIMENTS

The polyester of the present invention consists essentially of at least three recurring moieties which when combined in the polyester have been found to form an atypical optically anisotropic melt phase at a temperature below approximately 350° C. (e.g., below approximately 320° C.). The polymer melting temperatures may be confirmed by the use of a differential scanning calorimeter (i.e., DSC) employing repeat scans at a 20° C. per minute heat-up rate and observing the peak of the DSC melt transition. The polyester commonly exhibits a melting temperature of at least 225° C. and preferably of at least 235° C. as determined by differential scanning calorimetry. The polyester of the present invention may exhibit more than one DSC transition temperature. In such a case, the temperature corresponding to the major DSC peak (i.e., the peak having the greatest area beneath it) is taken to be the polymer melting temperature.

Because of its ability to exhibit anisotropic properties (i.e., liquid crystalline properties) in the melt, the polyester readily can form a product having a highly oriented molecular structure upon melt processing. Preferred polyesters are capable of undergoing melt processing at a temperature within the range of approximately 250° C. to 320° C.

The polyester comprises three essential moieties. Moiety I can be termed a 6-oxy-2-naphthoyl moiety and possesses the structural formula:

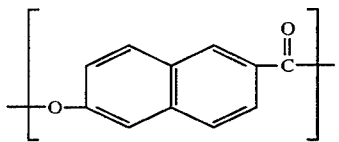

While not specifically illustrated in the structural formula, at least some of the hydrogen atoms present upon the aromatic rings of moiety I may be substituted. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-5,7-dichloro-2-naphthoic acid, etc. The presence of ring substitution tends to modify to some degree the physical properties of the resulting polymer (e.g., the polymer may soften at a lower temperature, its impact strength may be improved, and the crystallinity of the solid polymer may be decreased). In a preferred embodiment wherein a polyester of optimum crystallinity in the solid state is desired, no ring substitution is present.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 58, 2835–45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

Moiety I comprises approximately 20 to 90 mole percent of the polyester. In a preferred embodiment, moiety I is present in a concentration of approximately 50 to 70 mole percent, and most preferably in a concentration of approximately 60 mole percent.

The second essential moiety (i.e., moiety II) is a dioxyaryl moiety of the formula +O—Ar—O+ where Ar is a divalent radical comprising at least one aromatic ring. Moiety II preferably is symmetrical in the sense that the divalent bonds which join the moiety to other moieties in the main polymer chain are symmetrically disposed on one or more aromatic rings (e.g., are para to each other or diagonally disposed when present on a naphthalene ring). Moiety II comprises approximately 5 to 40 mole percent of the polyester, and preferably approximately 15 to 25 mole percent (e.g., approximately 20 mole percent). Preferred moieties which may serve as a symmetrical dioxyaryl moiety in the polyester of the present invention include:

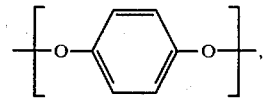

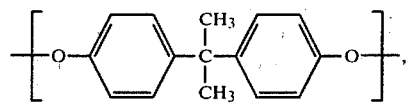

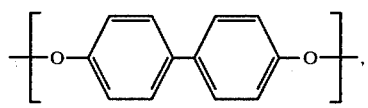

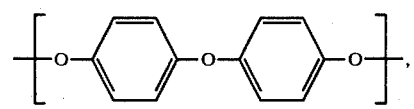

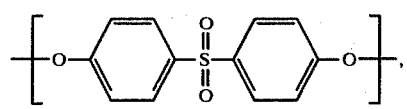

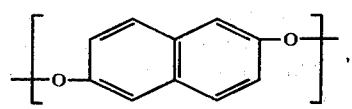

and mixtures of the foregoing. Highly satisfactory polymers can be formed wherein the dioxyaryl moiety is free of ring substitution.

Particularly preferred dioxyaryl moieties are:

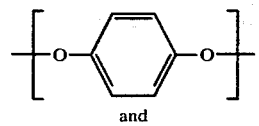

and

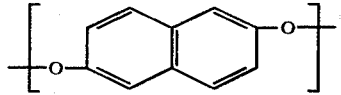

which readily may be derived from hydroquinone and 2,6-dihydroxynaphthalene, respectively. Representative examples of ring substituted compounds from which moiety II can be derived include methylhydroquinone, chlorohydroquinone, bromohydroquinone, phenylhydroquinone, etc. An example of a non-symmetrical dioxy aryl moiety is that derived from resorcinol.

The third essential moiety (i.e., moiety III) can be termed a trans-1,4-dicarboxycyclohexane moiety and possesses the structural formula:

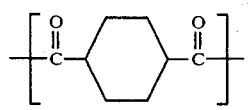

As will be apparent to those skilled in the art, moiety III can be derived from unsubstituted 1,4-cyclohexanedicarboxylic acid (hexahydroterephthalic acid) and substituted derivatives thereof. 1,4-cyclohexanedicarboxylic acid is prepared by the hydrogenation of terephthalic acid or, more commonly, by the hydrogenation of dimethyl terephthalate. 1,4-cyclohexanedicarboxylic acid is available commercially from the Eastman Kodak Company.

Moiety III comprises approximately 10 to 40 mole percent of the polymer. In a preferred embodiment, moiety III is present in a concentration of approximately 15 to 25 mole percent, and most preferably in a concentration of approximately 20 mole percent.

It has been found that only moiety III units in the trans configuration give rise to a polyester which exhibits anisotropy in the melt phase. This is believed to be due to the disruption and destruction of the rod-like nature of the polymer molecules by the presence of moiety III units in the cis configuration. However, a relatively small amount of moiety III in the cis configuration, as compared with the total amount of polymer, can be tolerated without seriously affecting the anisotropic nature of the polymer in the melt. It is nevertheless preferable to maximize the amount of moiety III in the trans configuration which is present in the polymer. Thus, it is preferred that at least 90 percent (e.g., 95 percent or more) of the moiety III units be present in the trans configuration.

Trans- and cis-1,4-cyclohexanedicarboxylic acid can be distinguished from one another by such techniques as NMR and IR spectroscopy, as well as by their melting points. A melting point calibration curve is one means by which the relative amounts of trans- and cis-1,4-cyclohexanedicarboxylic acid in a mixture of the isomers can be determined.

In addition to the three essential moieties described above, the polyester may further comprise an additional moiety (moiety IV). Moiety IV can be termed a dicarboxyaryl moiety of the formula

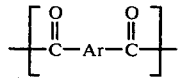

where Ar is a divalent radical comprising at least one aromatic ring. Like moiety II, moiety IV is preferably symmetrical in the sense that the divalent bonds which join the moiety to other moieties in the main polymer chain are symmetrically disposed on one or more aromatic rings (e.g., are para to each other or diagonally disposed when present on a naphthalene ring). Moiety IV comprises approximately 0 to 30 mole percent of the polyester, and preferably 0 to 20 mole percent. The preferred moiety which may serve as a symmetrical dicarboxyaryl moiety in the polyester of the present invention is a terephthaloyl moiety. An example of a non-symmetrical dicarboxyaryl moiety is an isophthaloyl moiety. Highly satisfactory polymers can be formed wherein the dicarboxyaryl moiety is free of ring substitution.

The substitution, if present, of each of the moieties described above is selected from the group consisting of an alkyl group of 1 to 4 carbon atoms, an alkoxy group of 1 to 4 carbon atoms, halogen, phenyl, and mixtures of the foregoing.

Other ester-forming moieties (e.g., dicarboxy, dioxy, or hydroxycarboxy units) other than those previously discussed additionally may be included in the polyester of the present invention in a minor concentration so long as such moieties do not adversely influence the desired anisotropic melt phase exhibited by the polyester heretofore defined and do not raise the melting point of the resulting polymer. As will be apparent to those skilled in the art, the total molar quantities of dicarboxy units and dioxy units present within the polyester will be substantially equal. For instance, the molar quantity of moiety II and the total molar quantity of moieties III and IV commonly are substantially equal. The various moieties upon polymer formation will tend to be present in a random configuration.

The polyester of the present invention commonly exhibits

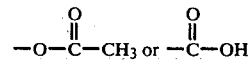

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

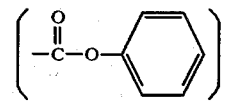

and methylester

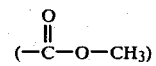

optionally may be included at the end of the polymer chains. The polymer also may be oxidatively cross-linked to at least some degree, if desired, by heating in a oxygen-containing atmosphere (e.g., in air) while in bulk form or as a previously shaped article at a temperature below its melting point for a limited period of time (e.g., for a few minutes).

The polyester of the present invention tends to be substantially insoluble in all common polyester solvents, such as hexafluoroisopropanol and o-chlorophenol, and accordingly is not susceptible to solution processing. It can surprisingly be readily processed by common melt processing techniques as discussed hereafter. Most compositions are soluble to some degree in pentafluorophenol.

The polyester of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infrared spectroscopy on compression molded films. Alternatively, light scattering techniques in a pentafluorophenol solution may be employed to determine the molecular weight.

The polyester prior to heat treatment additionally commonly exhibits an inherent viscosity (i.e., I.V.) of at least approximately 1.0 dl./g., and preferably at least approximately 2.0 dl./g. (e.g., approximately 3.0 to 9.0 dl./g.) when dissolved in a concentration of 0.1 percent by weight in pentafluorophenol at 60° C.

The polyester of the present invention commonly may be considered crystalline in the sense that fibers melt extruded therefrom exhibit x-ray diffraction patterns using Ni-filtered CuK α radiation and flat plate cameras characteristic of polymeric crystalline materials. In those embodiments wherein ring substitution is present as previously described or certain aryl diols, such as 2,2-bis[4-hydroxyphenyl] propane, are present, the polyesters may be substantially less crystalline in the solid phase and exhibit diffraction patterns typical of oriented amorphous fibers. In spite of the crystallinity commonly observed, the polyester of the present invention nevertheless may be easily melt processed in all instances.

Unlike the polyesters commonly encountered in much of the prior art, the polyester of the present invention is not intractable and forms an anisotropic melt phase whereby an atypical degree of order is manifest in the molten polymer. The subject polyester readily forms liquid crystals in the melt phase. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed polarizers. The amount of light transmitted increases when the sample is optically anisotropic even in the static state.

The polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat-exchange fluid via a melt acidolysis procedure. They, accordingly, may be heated initially to form a melt solution of the reactants with the reaction continuing as solid polymer particles are formed and suspended therein. A vacuum may be applied to facilitate removal of volatiles formed during the final stage of the condensation (e.g., acetic acid or water).

In commonly assigned U.S. Pat. No. 4,067,852 of Gordon W. Calundann, entitled "Melt Processable Thermotropic Wholly Aromatic Polyester Containing Polyoxybenzoyl Units" is described another slurry polymerization process which, although directed to the production of wholly aromatic polyesters, may be employed to form the polyester of the present invention. In that process, the solid product is suspended in a heat exchange medium. The disclosure of this patent is herein incorporated by reference.

When employing either the melt acidolysis procedure or the slurry procedure of U.S. Pat. No. 4,067,852, the organic monomer reactants from which the 6-oxy-2-naphthoyl moiety (i.e., moiety I), and the dioxyaryl moiety (i.e., moiety II), are derived may be initially provided in a modified form whereby the usual hydroxyl groups of these monomers are esterified (i.e., they are provided as acyl esters). For instance, lower acyl esters of 6-hydroxy-2-naphthoic acid and hydroquinone, wherein the hydroxy groups are esterified, may be provided as reactants. The lower acyl groups preferably have from about 2 to about 4 carbon atoms. Preferably, the acetate esters of the organic compounds which form moieties I and II are provided. Accordingly, particularly preferred reactants for the condensation reaction are 6-acetoxy-2-naphthoic acid and hydroquinone diacetate.

Representative catalysts which optionally may be employed in either the melt hydrolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids (e.g., sodium acetate), the gaseous acid catalysts such as Lewis acids (e.g., $BF_3$), hydrogen halides (e.g., HCl), etc. The quantity of catalysts utilized typically is about 0.001 to 1 percent by weight based upon the total monomer weight, and most commonly about 0.01 to 0.2 percent by weight.

The molecular weight of a previously formed polyester may be further increased via a solid state polymerization procedure wherein the particulate polymer is heated in a flowing inert gaseous atmosphere (e.g., in a flowing nitrogen atmosphere) at a temperature approximately 20° C. below the melting temperature of the polymer for 10 to 12 hours.

The polyester of the present invention readily can be melt processed to form a variety of shaped articles, e.g., molded three-dimensional articles, fibers, films, tapes, etc. The polyester of the present invention is suited for molding applications and may be molded via standard injection molding techniques commonly utilized when forming molded articles. Unlike many of the polyesters commonly encountered in the prior art, it is not essential that more severe injection molding conditions (e.g., higher temperatures), compression molding, impact molding, or plasma spraying techniques be utilized. Fibers or films may be melt extruded.

A molding compound may be formed from the polyester of the present invention which incorporates approximately 1 to 60 percent by weight of a solid filler (e.g., talc) and/or reinforcing agent (e.g., glass fibers).

The polyester also may be employed as a coating material which is applied as a powder or from a liquid dispersion.

When forming fibers and films, the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material, the spinneret selected may contain one and preferably a plurality of extrusion orifices. For instance, a standard conical spinneret, such as those commonly used in the melt spinning of polyethylene terephthalate, containing 1 to 2000 holes (e.g., 6 to 1500 holes) having a diameter of about 1 to 60 mils (e.g., 5 to 40 mils) may be utilized. Yarns of about 20 to 200 continuous filaments are commonly formed. The melt-spinnable polyester is supplied to the extrusion orifice at a temperature above its melting point, e.g., a temperature of about 250° C. to 320° C. in preferred embodiments.

Subsequent to extrusion through the shaped orifice, the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 30.

The resulting filamentary material or film optionally may be subjected to a thermal treatment whereby its physical properties are further enhanced. The tenacity of the fiber or film generally is increased by such thermal treatment. More specifically, the fibers or films preferably may be thermally treated in an inert atmosphere (e.g., nitrogen, argon, helium) or alternatively in a flowing oxygen-containing atmosphere (e.g., air) with or without stress at a temperature below the polymer melting point until the desired property enhancement is achieved. Thermal treatment times commonly range from a few minutes to several days. Generally, as the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 10° C. to 20° C. below the temperature at which it melts for about 45 hours. Optimal heat treatment conditions will vary with the specific composition of the polyester and with the process history of the fiber.

The as-spun fibers formed from the polyester of the present invention are fully oriented and exhibit highly satisfactory physical properties which render them suitable for use in high performance applications. The as-spun fibers commonly exhibit an average single filament tenacity of at least 3 grams per denier (e.g., about 4 to 6 grams per denier) and an average single filament tensile modulus of at least about 250 grams per denier (e.g., about 300 to 500 grams per denier) and exhibit an extraordinary dimensional stability at elevated temperature (e.g., at temperatures of about 150° to 200° C.). Following thermal treatment (i.e., annealing), the fibers commonly exhibit an average single filament tenacity of at least 10 grams per denier (e.g., 12 to 14 grams per denier) and a slight decrease in average single filament tensile modulus. Such properties enable the fibers to be used with particular advantage as tire cords and in other industrial applications, such as conveyor belts, hose, rope, cabling, resin reinforcement, etc. Films formed of the polyester of the present invention may be used as strapping tape, cable wrap, magnetic tape, electric motor dielectric film, etc. The fibers and films exhibit an inherent resistance to burning.

The polyester of the present invention is contemplated to be especially useful as a molding resin. The polyester is capable of exhibiting improvements in impact strength, color, and processability over wholly aromatic polyesters, e.g., those which include a terephthaloyl moiety to the exclusion of a trans-1,4-dicarboxylcyclohexane moiety.

The following Examples are presented as specific illustrations of the claimed invention. It should be understood, however, that the invention is not limited to the specific details set forth in the Examples.

EXAMPLE 1

A 300 ml. 3-neck polymer flask was fitted with a gas inlet with trap, a sealed glass paddle-stirrer, and a distillation head with thermometer, condenser, receiver adaptor, and measuring cylinder. In the flask were placed 80.5 g. (0.35 mole) of 6-acetoxy-2-naphthoic acid, 12.9 g. (0.075 mole) of 99% trans-1,4-cyclohexanedicarboxylic acid, and 14.6 g. (0.075 mole) of hydroquinone diacetate. 0.2 g. of sodium acetate was added as a catalyst. The mixture was flushed out with an inert gas (argon) then heated in an oil bath for 45 minutes at 250° C., 30 minutes at 280° C., 30 minutes at 310° C., 30 minutes at 330° C., and 30 minutes at 340° C.

Acetic acid gradually distilled out during the early stages. A total of 26.2 ml. was collected. The theoretical yield was 28.6 ml., giving a 92% yield. As the polymerization proceeded, the pearly opaque pale tan-colored melt grew somewhat more viscous. Eventually, vacuum (0.5 mm. Hg) was applied, and the reaction vessel was heated at 350° C. under vacuum for 25 minutes until bubbling ceased.

After releasing the vacuum and cooling under an inert gas atmosphere, the flask was broken and the lump of polymer was drawn up and then ground to 1/16 inch in a mill. The chips were extracted for 2 hours in a Soxhlet apparatus to remove monomeric compounds, shaft sealing oil, etc. The polymer had DSC double peaks at 235° C. and 300° C. The polymer exhibited an inherent viscosity of 5.6 dl./g. when measured at a concentration of 0.1 percent by weight in pentafluorophenol at 60° C.

The ground polymer was dried for 48 hours at 130° C. in a vacuum oven, then melt-spun through a 0.007 inch hole at 315° C. at a windup speed of 74 m./min.

The fibers exhibited the as-spun, single filament properties shown below:

| | |
|---|---|
| Tenacity | 5.86 g./d. |
| Elongation | 1.8% |
| Modulus | 432 g./d. |
| Denier | 22.6 |

EXAMPLE 2

6-acetoxy-2-naphthoic acid (50 mole percent), hydroquinone diacetate (25 mole percent) and 99% trans-1,4-cyclohexanedicarboxylic acid (25 mole percent) were reacted in the presence of sodium acetate catalyst according to the procedure in Example 1. The resulting polymer exhibited a melting temperature of 237° C. as determined by DSC and an inherent viscosity of 9.03 dl./g. when measured at a concentration of 0.1 percent by weight in pentafluorophenol at 60° C. The polymer was ground and then melt spun at 393° C. at a throughput of 0.42 g./hole/min. and a windup speed of 365 m./min.

The fibers exhibited the as-spun, single filament properties shown below:

| | |
|---|---|
| Tenacity | 3.1 g./d. |
| Elongation | 1.3% |
| Modulus | 280 g./d. |

| Denier | 11.3 |
|---|---|

EXAMPLE 3

6-acetoxy-2-naphthoic acid (40 mole percent), hydroquinone diacetate (30 mole percent), and 99% trans-1,4-cyclohexanedicarboxylic acid (30 mole percent) were reacted in the presence of sodium acetate catalyst according to the procedure of Example 1. The resulting polymer exhibited a melting temperature of 270° C. as determined by DSC and an inherent viscosity of 7.32 dl./g. when measured at a concentration of 0.1 percent by weight in pentafluorophenol at 60° C. The polymer was ground and then melt spun at 360° C. at a throughput of 0.14 g./hole/min. and a windup speed of 40 m./min.

The fibers exhibited the as-spun, single filament properties shown below:

| Tenacity | 3.0 g./d. |
|---|---|
| Elongation | 1.4% |
| Modulus | 250 g./d. |
| Denier | 22.1 |

EXAMPLE 4

The apparatus of Example 1 was charged with 6-acetoxy-2-naphthoic acid (69 g.; 0.30 mole), 4,4'-bis-acetoxybiphenyl (27.1 g.; 0.1004 mole), and 95% trans-1,4-cyclohexanedicarboxylic acid (17.2 g.; 0.10 mole). The reaction mixture was heated in an oil bath for 45 minutes at 250° C., 45 minutes at 280° C., 45 minutes at 300° C., and 45 minutes at 320° C. Vacuum (0.5 mm. Hg) was slowly applied and held for 20 minutes at 320° C. by which time the melt was very viscous. The total yield of distilled acetic acid was 26.1 ml. (91% theoretical). The polymer was broken from the flask when cool, freed from fragments of glass, and ground in a Wiley Mill. Its DSC curve showed multiple $T_m$ peaks at 285° C., 312° C., and 335° C., the last one having the greatest area beneath it. The polymer exhibited an I.V. of 4.09 dl./g. when measured as in Example 1.

The polymer was melt spun at 345° C. through a single 0.007 inch hole at a throughput of 0.42 g./min. The resulting filaments exhibited the following as-spun single filament properties:

| Tenacity | 8.7 g./d. |
|---|---|
| Elongation | 2.0% |
| Modulus | 511 g./d. |
| Denier | 1.7 |

The filaments were heated in a relaxed state for 4 hours at 300° C. Following heat treatment, the filaments exhibited the following single filament properties:

| Tenacity | 12.2 g./d. |
|---|---|
| Elongation | 2.4% |
| Modulus | 477 g./d. |

EXAMPLE 5

A four-component copolyester was prepared according to the procedure of Example 1 by reacting together 6-acetoxy-2-naphthoic acid (34.5 g.; 0.15 mole), terephthalic acid (16.6 g.; 0.10 mole), 95% trans-1,4-cyclohexanedicarboxylic acid (17.2 g.; 0.10 mole), and hydroquinone diacetate (39.5 g.; 0.204 mole). Sodium acetate (0.02 g.) was added as catalyst.

Polymerization was carried out for 45 minutes at 250° C., 45 minutes at 280° C., 45 minutes at 290° C., and 45 minutes at 300° C. Finally, vacuum was applied (0.5 mm. Hg) at 310° C. and held there for 60 minutes, by which time the melt had balled around the stirrer shaft. The final yield of acetic acid was 30.0 ml. (95% of the theoretical yield).

The polymer was isolated and ground as previously described. Its DSC showed a single sharp endotherm at 300° C. The I.V. in pentafluorophenol at 60° C. was 7.48 dl./g.

The polymer was melt spun at 330° C. through a single 0.007 inch hole at 0.42 g./min. and wound up at 1,639 m./min. The resulting filaments exhibited the following as-spun single filament properties:

| Tenacity | 7.2 g./d. |
|---|---|
| Elongation | 2.0% |
| Modulus | 370 g./d. |
| Denier | 2.4 |

The filaments were heated in a relaxed state for 4 hours at 300° C. Following heat treatment, the filaments exhibited the following single filament properties:

| Tenacity | 12.8 g./d. |
|---|---|
| Elongation | 2.4% |
| Modulus | 470 g./d. |

EXAMPLE 6

A four-component polymer was prepared according to the procedure of Example 1 by reacting 6-acetoxy-2-naphthoic acid (69.0 g.; 0.30 mole), terephthalic acid (8.3 g.; 0.05 mole), and hydroquinone diacetate (19.5 g.; 0.101 mole) in the presence of 0.02 g. sodium acetate catalyst.

The polymer exhibited an I.V. of 4.17 dl./g. when measured as before and a DSC melting temperature of 258° C. The polymer was melt spun through a single 0.007 inch hole at 285° C. at 0.14 g./min. and wound up at 201 m./min. The resulting filaments exhibited the following as-spun single filament properties:

| Tenacity | 7.0 g./d. |
|---|---|
| Elongation | 2.0% |
| Modulus | 440 g./d. |
| Denier | 7.0 |

Although the invention has been described with preferred embodiments, it is to be understood that variations and modifications may be employed as will be apparent to those skilled in the art. Such variations and modifications are to be considered within the purview and scope of the claims appended hereto.

We claim:

1. A melt processable polyester capable of forming an anisotropic melt phase at a temperature below approximately 350° C. consisting essentially of the recurring moieties I, II, III, and IV which may include substitution of at least some of the hydrogen atoms present upon the rings wherein I is

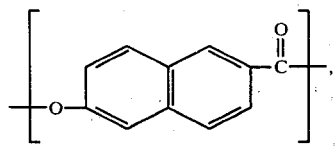

II is a dioxyaryl moiety of the formula

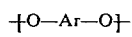

where Ar is a divalent radical comprising at least one aromatic ring,

III is

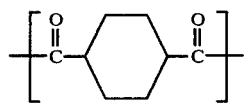

wherein at least approximately 90 percent of said III units are in the trans configuration, and IV is a dicarboxyaryl moiety of the formula

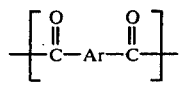

where Ar is a divalent radical comprising at least one aromatic ring, with said optional substitution if present being selected from the group consisting of an alkyl group of 1 to 4 carbon atoms, an alkoxy group of 1 to 4 carbon atoms, halogen, a phenyl group, and mixtures of the foregoing, and wherein said polyester comprises approximately 20 to 90 mole percent of moiety I, approximately 5 to 40 mole percent of moiety II, approximately 10 to 40 mole percent of moiety III, and approximately 0 to 30 mole percent of moiety IV.

2. A melt processable polyester according to claim 1 which is capable of forming an anisotropic melt phase at a temperature below approximately 320° C.

3. A melt processable polyester according to claim 1 wherein said dioxyaryl moiety II is symmetrically disposed.

4. A melt processable polyester according to claim 3 wherein said dioxyaryl moiety II is selected from the group consisting of

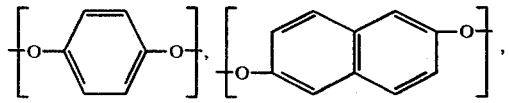

and mixtures thereof.

5. A melt processable polyester according to claim 1 wherein each moiety is substantially free of ring substitution.

6. A melt processable polyester according to claim 1 which comprises approximately 50 to 70 mole percent of moiety I, approximately 15 to 25 mole percent of moiety II, approximately 15 to 25 mole percent of moiety III, and approximately 0 mole percent of moiety IV.

7. A melt processable polyester according to claim 1 which exhibits an inherent viscosity of at least approximately 1.0 dl./g. when dissolved in a concentration of 0.1 percent by weight in pentafluorophenol at 60° C.

8. A melt processable polyester according to claim 7 which exhibits an inherent viscosity of at least approximately 2.0 dl./g. when dissolved in a concentration of 0.1 percent by weight in pentafluorophenol at 60° C.

9. A melt processable polyester according to claim 8 which exhibits an inherent viscosity within the range of approximately 3.0 to 9.0 dl./g. when dissolved in a concentration of 0.1 percent by weight in pentafluorophenol at 60° C.

10. A fiber which has been melt spun from the melt processable polyester of claim 1.

11. A film which has been melt extruded from the melt processable polyester of claim 1.

12. A molded article comprising the melt processable polyester of claim 1.

13. A molding compound comprising the melt processable polyester of claim 1 which incorporates approximately 1 to 60 percent by weight of a solid filler and/or reinforcing agent.

14. A melt processable polyester capable of forming an anisotropic melt phase at a temperature below approximately 320° C. consisting essentially of the recurring moieties I, II, and III which may include substitution of at least some of the hydrogen atoms present upon the rings wherein:

I is

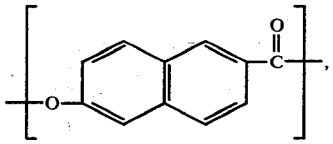

II is a symmetrical dioxyaryl moiety of the formula +O—Ar—O+ where Ar is a divalent radical comprising at least one aromatic ring, and III is

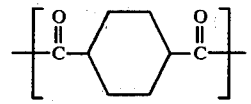

wherein at least 95 percent of said III units are in the trans configuration, with said optional substitution if present being selected from the group consisting of an alkyl group of 1 to 4 carbon atoms, an alkoxy group of 1 to 4 carbon atoms, halogen, a phenyl group, and mixtures of the foregoing, and wherein said polyester comprises approximately 50 to 70 mole percent of moiety I, approximately 15 to 25 mole percent of moiety II, and approximately 15 to 25 mole percent of moiety III.

15. A melt processable polyester according to claim 14 wherein said symmetrical dioxyaryl moiety II is selected from the group consisting of:

-continued

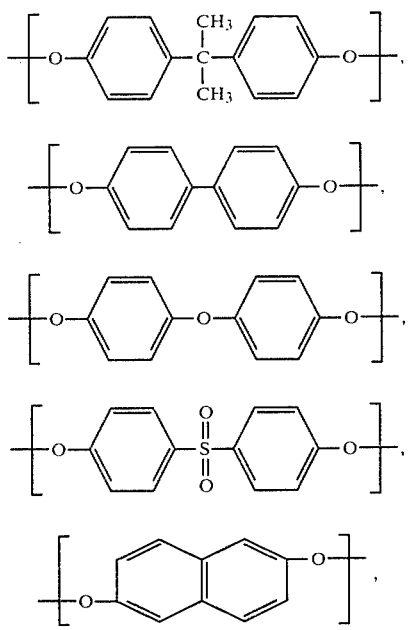

and mixtures of the foregoing.

16. A melt processable polyester according to claim 15 wherein said symmetrical dioxyaryl moiety comprises

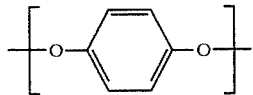

17. A melt processable polyester according to claim 15 wherein said symmetrical dioxyaryl moiety comprises

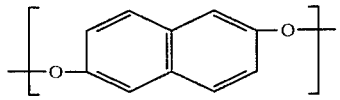

18. A melt processable polyester according to claim 14 wherein each moiety is substantially free of ring substitution.

19. A melt processable polyester according to claim 14 which comprises approximately 60 mole percent of moiety I, approximately 20 mole percent of moiety II, and approximately 20 mole percent of moiety III.

20. A melt processable polyester according to claim 14 which exhibits an inherent viscosity of at least approximately 1.0 dl./g. when dissolved in a concentration of 0.1 percent by weight in pentafluorophenol at 60° C.

21. A melt processable polyester according to claim 20 which exhibits an inherent viscosity of at least approximately 2.0 dl./g. when dissolved in a concentration of 0.1 percent by weight in pentafluorophenol at 60° C.

22. A melt processable polyester according to claim 21 which exhibits an inherent viscosity within the range of approximately 3.0 to 7.0 dl./g. when dissolved in a concentration of 0.1 percent by weight in pentafluorophenol at 60° C.

23. A fiber which has been melt spun from the melt processable polyester of claim 14.

24. A film which has been melt extruded from the melt processable polyester of claim 14.

25. A molded article comprising the melt processable polyester of claim 14.

26. A molding compound comprising the melt processable polyester of claim 14 which incorporates approximately 1 to 60 percent by weight of a solid filler and/or reinforcing agent.

27. A melt processable polyester capable of forming an anisotropic melt phase at a temperature below approximately 320° C. consisting essentially of the recurring moieties I, II, and III wherein:

I is

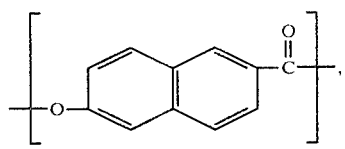

II is selected from the group consisting of

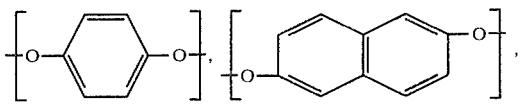

and mixtures thereof, and
III is

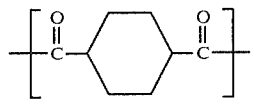

wherein at least approximately 95 percent of said III units are in the trans configuration, said moieties being substantially free of ring substitution, and wherein said polyester comprises approximately 50 to 70 mole percent of moiety I, approximately 15 to 25 mole percent of moiety II, and approximately 15 to 25 mole percent of moiety III.

28. A melt processable polyester according to claim 27 which comprises approximately 60 mole percent of moiety I, approximately 20 mole percent of moiety II, and approximately 20 mole percent of moiety III.

29. A melt processable polyester according to claim 28 wherein said moiety II is

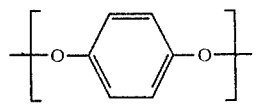

30. A melt processable polyester according to claim 28 wherein said moiety II is

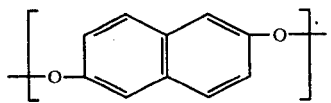

31. A melt processable polyester according to claim 27 which exhibits an inherent viscosity of at least approximately 1.0 dl./g. when dissolved in a concentration of 0.1 percent by weight in pentafluorophenol at 60° C.

32. A melt processable polyester according to claim 31 which exhibits an inherent viscosity of at least approximately 2.0 dl./g. when dissolved in a concentration of 0.1 percent by weight in pentafluorophenol at 60° C.

33. A melt processable polyester according to claim 32 which exhibits an inherent viscosity within the range of approximately 3.0 to 7.0 dl./g. when dissolved in a concentration of 0.1 percent by weight in pentafluorophenol at 60° C.

34. A fiber which has been melt spun from the melt processable polyester of claim 27.

35. A film which has been melt extruded from the melt processable polyester of claim 27.

36. A molded article comprising the melt processable polyester of claim 27.

37. A molding compound comprising the melt processable polyester of claim 27 which incorporates approximately 1 to 60 percent by weight of a solid filler and/or reinforcing agent.

* * * * *